(12) United States Patent
Gifford (10) Patent No.: US 8,423,596 B2
(45) Date of Patent: Apr. 16, 2013

(54) METHODS OF MULTIVARIATE DATA CLUSTER SEPARATION AND VISUALIZATION

(76) Inventor: Sean Gifford, Syracuse, NY (US)

( * ) Notice: Subject to any disclaimer, the term of this patent is extended or adjusted under 35 U.S.C. 154(b) by 633 days.

(21) Appl. No.: 12/700,320

(22) Filed: Feb. 4, 2010

(65) Prior Publication Data

US 2010/0198900 A1 Aug. 5, 2010

Related U.S. Application Data

(60) Provisional application No. 61/150,083, filed on Feb. 5, 2009.

(51) Int. Cl.
*G06F 17/14* (2006.01)
(52) U.S. Cl.
USPC .......................................................... 708/401
(58) Field of Classification Search ................... 708/400
See application file for complete search history.

(56) References Cited

U.S. PATENT DOCUMENTS

| | | | | |
|---|---|---|---|---|
| 6,588,571 | B1 * | 7/2003 | Baudat | 194/328 |
| 6,873,325 | B1 * | 3/2005 | Kontkanen et al. | 345/440 |

OTHER PUBLICATIONS

A.D. Flouris and J. Duffy, "Applications of artificial intelligence systems in the analysis of epidemiological data", Eur. J. Epidemiol., vol. 21, No. 3, 2006, pp. 167-170.
G. Hellenthal and M. Stephens, "Insights into recombination from population genetic variation", Curr. Opin. Genet. Dev., vol. 16, No. 6, 2006, pp. 565-572.
J.A. Hanley, "Receiver operating characteristic (ROC) methodology: the state of the art", Crit. Rev. Diagn. Imaging, vol. 29, No. 3, 1989, pp. 307-335.
W.P. Hanage and D.M. Aanensen, "Methods for data analysis", Methods Mol. Biol., vol. 551, 2009, pp. 287-304.
W. Shannon et al., "Analyzing microarray data using cluster analysis", Pharmacogenomics, vol. 4, No. 1, 2003, pp. 41-52.
H. Stenlund et al., "Orthogonal projections to latent structures discriminant analysis modeling on in situ FT-IR spectral imaging of liver tissue for identifying sources of variability", Anal. Chem., vol. 80, No. 18, 2008, pp. 6898-6906.
G. Yona et al., "Comparing algorithms for clustering of expression data: how to assess gene clusters", Methods Mol. Biol., vol. 541, 2009, pp. 479-509.
Tax et al., "Outlier Detection Using Ball Descriptions with Adjustable Metric", SSPR&SPR, 2006, pp. 587-595.
UC Irvine Machine Learning Repository, http://archive.ics.uci.edu/ml/.
UC Irvine Heart Disease Data, http://archive.ics.uci.edu/ml/machine-learning-databases/heart-disease/processed. cleveland.data.

(Continued)

*Primary Examiner* — Tan V. Mai
(74) *Attorney, Agent, or Firm* — Brown & Michaels, PC (57) ABSTRACT

A method separates multivariate data points in lower dimensional space, where each data point has been classified into one of a plurality of data clusters including at least a first data cluster and a second data cluster. The method includes the step of acquiring an ND-to-3D transformation matrix for transforming the plurality of multivariate data points to a plurality of three-dimensional data points. The method preferably includes the sub-step of performing a center of mass (COM) separation of the clusters to acquire a COM transformation matrix, where the COM transformation matrix is the ND-to-3D transformation matrix. The method also includes the step of performing a receiver-operator characteristic curve (ROC) separation to acquire an ROC transformation matrix for transforming the plurality of three-dimensional data points to a plurality of data points in a dimension lower than 3D and preferably a re-optimized COM transformation matrix.

18 Claims, 9 Drawing Sheets

OTHER PUBLICATIONS

UC Irvine Breast Cancer Data, http://archive.ics.uci.edu/ml/machine-learning-databases/breast-cancer-wisconsin/breast-cancer-wisconsin.data.

UC Irvine *E. coli* Data, http://archive.ics.uci.edu/ml/machine-learning-databases/ecoli/ecoli.data.

* cited by examiner

METHODS OF MULTIVARIATE DATA CLUSTER SEPARATION AND VISUALIZATION

REFERENCE TO RELATED APPLICATIONS

This application claims one or more inventions which were disclosed in Provisional Application No. 61/150,083, filed Feb. 5, 2009, entitled "METHODS OF MULTIVARIATE DATA CLUSTER SEPARATION AND VISUALIZATION". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of multivariate data analysis. More particularly, the invention pertains to methods of separating multivariate data clusters in lower dimensional space.

2. Description of Related Art

Modern medical procedures often generate more data on a single patient than can possibly be fully visualized, interpreted, or assimilated by a human being alone. Humans are comfortable perceiving three-dimensional (3D) images, albeit as a combination of stereoscopic two-dimensional (2D) images from each eye, and we can perceive their transformation in time, but higher dimensional (ND) space is not readily conceived. Thus, in a field such as medicine where one is often confronted with highly multi-dimensional data, we typically rely on a physician's intuition and expertise in being able to integrate all of the varied test results, observations, and patient history details that are each weighted differently, in the physician's mind, such that a proper, or at least a most-likely, diagnosis can be determined.

Diagnostic medical assays are often judged by their so-called receiver-operator characteristic (ROC) curve, in which the sensitivity of an assay is plotted against its specificity, and the area under the curve (AUC) helps objectively determine whether a given assay is clinically useful (see J. A. Hanley, "Receiver operating characteristic (ROC) methodology: the state of the art", *Crit. Rev. Diagn. Imaging*, vol. 29, no. 3, 1989, pp. 307-35). The AUC value is normalized such that a perfect assay would have an AUC value of 1. Typically an AUC value of 0.75 or higher is considered to be clinically useful.

A host of statistical tools are available to assist in analyzing large data sets, including regression analysis, cluster analysis, and principal component analysis, not only in the medical field, but also in finance, meteorology, astronomy and any other field in which the dimensionality of the relevant data necessitates a computerized analysis of its patterns (see A. D. Flouris and J. Duffy, "Applications of artificial intelligence systems in the analysis of epidemiological data", *Eur. J. Epidemiol.*, vol. 21, no. 3, 2006, pp. 167-70; and G. Hellenthal and M. Stephens, "Insights into recombination from population genetic variation", *Curr. Opin. Genet. Dev.*, vol. 16, no. 6, 2006, pp. 565-72). However, statisticians do not currently employ tools that allow one to ideally weight the contribution of high-dimensional vectors, in order to produce a clearly-visible, lower-order separation of data clusters.

There have been a number of proposed algorithms for efficiently reducing data complexity and for properly analyzing data cluster subpopulations, using either unsupervised, semi-supervised, or supervised approaches (see W. P. Hanage and D. M. Aanensen, "Methods for data analysis", *Methods Mol. Biol.*, vol. 551, 2009, pp. 287-304; W. Shannon et al., "Analyzing microarray data using cluster analysis", *Pharmacogenomics*, vol. 4, no. 1, 2003, pp. 41-52; H. Stenlund et al., "Orthogonal projections to latent structures discriminant analysis modeling on in situ FT-IR spectral imaging of liver tissue for identifying sources of variability", *Anal. Chem.*, vol. 80, no. 18, 2008, pp. 6898-906; and G. Yona et al. "Comparing algorithms for clustering of expression data: how to assess gene clusters", *Methods Mol. Biol.*, vol. 541, 2009, pp. 479-509). These range from simple statistical evaluations (e.g. Gaussian distributions, minimum covariance estimators) to more complex weighted functions (e.g. support vector data description, $l_p$ distance, orthogonal projections to latent structures), but there is typically a trade-off between ease-of-use and the quality of results that they provide. More complex multivariate analysis methods generally provide greater diagnostic/predictive power, but are often too advanced to be implemented or understood by a typical biomedical researcher, even one with access to complicated, and often quite expensive, multivariate data analysis software.

There is a need in the art for a method of finding a mathematical transformation that produces distinct, observable data clustering to allow future, unknown data to be categorized easily and reliably. In the medical field, this would involve finding a transformation matrix, or set of transformation matrices, that, when applied to the appropriate data vector that has been gathered for an individual patient, results in a highly accurate diagnosis of their disease state or states, inasmuch as the acquired data were relevant factors in determining the presence or absence of such states. Reducing data dimensionality for this kind of straightforward hypothesis testing would be applicable to other fields, including, but not limited to, economics, finance, insurance, meteorology, and astronomy.

SUMMARY OF THE INVENTION

A method separates multivariate data points in lower dimensional space, where each data point has been classified into one of a plurality of data clusters including at least a first data cluster and a second data cluster. The method includes the step of acquiring an ND-to-3D transformation matrix for transforming the plurality of multivariate data points to a plurality of three-dimensional data points. The method preferably includes the sub-step of performing a center of mass (COM) separation of the clusters to acquire a COM transformation matrix, where the COM transformation matrix is the ND-to-3D transformation matrix. The method also includes the step of performing a receiver-operator characteristic curve (ROC) separation to acquire an ROC transformation matrix for transforming the plurality of three-dimensional data points to a plurality of data points in a dimension lower than 3D and preferably a re-optimized COM transformation matrix.

DETAILED DESCRIPTION OF THE INVENTION

A computer as used herein is a type of processor and may be any device capable of manipulating data according to instructions.

A receiver-operator characteristic (ROC) curve as used herein is the curve formed from the plot of the sensitivity versus the specificity of an assay.

An area under the curve (AUC) value is the area under the ROC curve when the sensitivity and the specificity are normalized.

A principal component analysis (PCA) as used herein is a transformation in vector space to reduce a multidimensional data set to a lower dimension.

A center of mass (COM) separation as used herein is a mathematical method that optimizes an ND-to-3D transformation matrix to maximize the distance between the centers of two or more data clusters relative to cluster size, when the data clusters are projected into lower dimensional space.

A percent overlap separation or a receiver-operator characteristic curve (ROC) separation as used interchangeably herein is a mathematical method that optimizes a transformation matrix, preferably a 3D-to-2D transformation matrix, to maximize the area under the curve (AUC) for the receiver-operator characteristic (ROC) curve.

A method of the present invention separates multivariate data clusters, where each cluster makes up a known subpopulation of the total data set. The method includes reducing the fraction of the two or more data clusters that overlap when projected into lower-dimensional space for visualization and analysis. An optimal separation is achieved by determining a transformation matrix, or set of transformation matrices, that, when applied to the original high-dimension data matrix, results in the least amount of overlap between the lower-dimensional clusters when projected into this observable space (1D to 3D).

A method of the present invention includes implementing a full set of transformation steps that have been reduced to practice in the case of a set of 25-dimensional (25D) randomly-generated data, a set of 13D heart disease data, a set of 9D breast cancer data, a set of 7D *Escherichia coli* (*E. coli*) genetic data, and a set of 57D sleep apnea data. The steps of the method create an optimal transformation matrix, or an optimal set of transformation matrices, for data cluster separation, and for subsequent decision-making and/or hypothesis-testing.

In a first step of a preferred method of the present invention, a set of N-dimensional (ND) data is classified into two or more known clusters. In some embodiments, the data classification is performed using a processor. For example, the first cluster is "disease state X, positive", and the second cluster is "disease state X, negative", where the disease state X is known for all of the data points in the N-dimensional data set.

In a second step of the method, missing data in the ND data set are substituted, if necessary. In some embodiments, the substitution of missing data is performed using a processor. If data have not been acquired for a subset of a patient's ND data, and each component of this data subset has been deemed important for the classification of the data (i.e. necessary to improve cluster separation), then the missing data is substituted with mean or median values, as appropriate, from the database of known patient data for each component of this subset in one embodiment. Alternatively, it may be advantageous to substitute the missing data as a function of the data for only the patients in the data set that otherwise show the highest correlation with the patient's data vector that is being substituted.

Figure 1A:
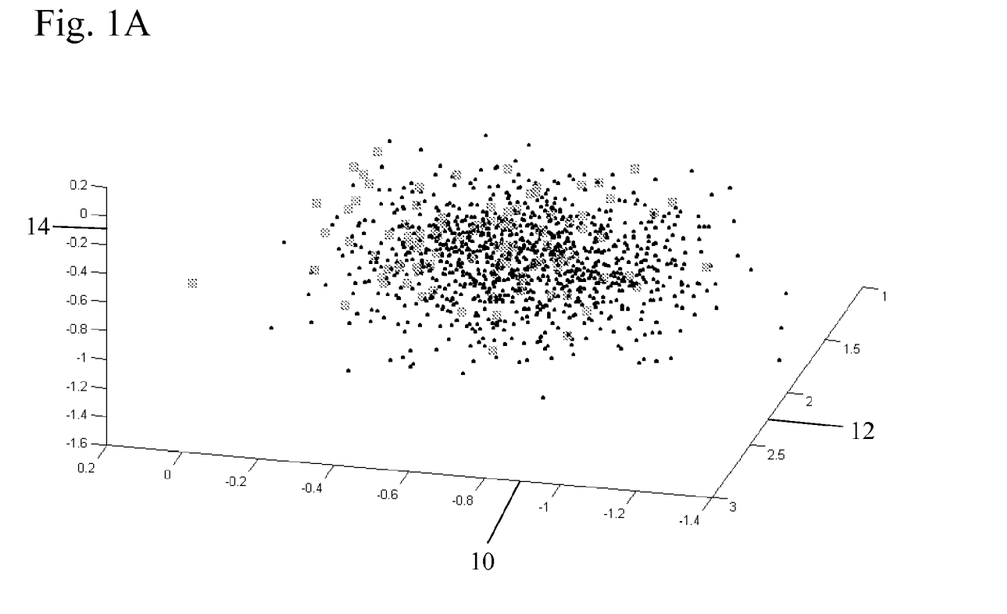
FIG. 1A shows the results of performing a principal component analysis (PCA) on 25D randomly generated data, projected into 3D.
Figure 1B:
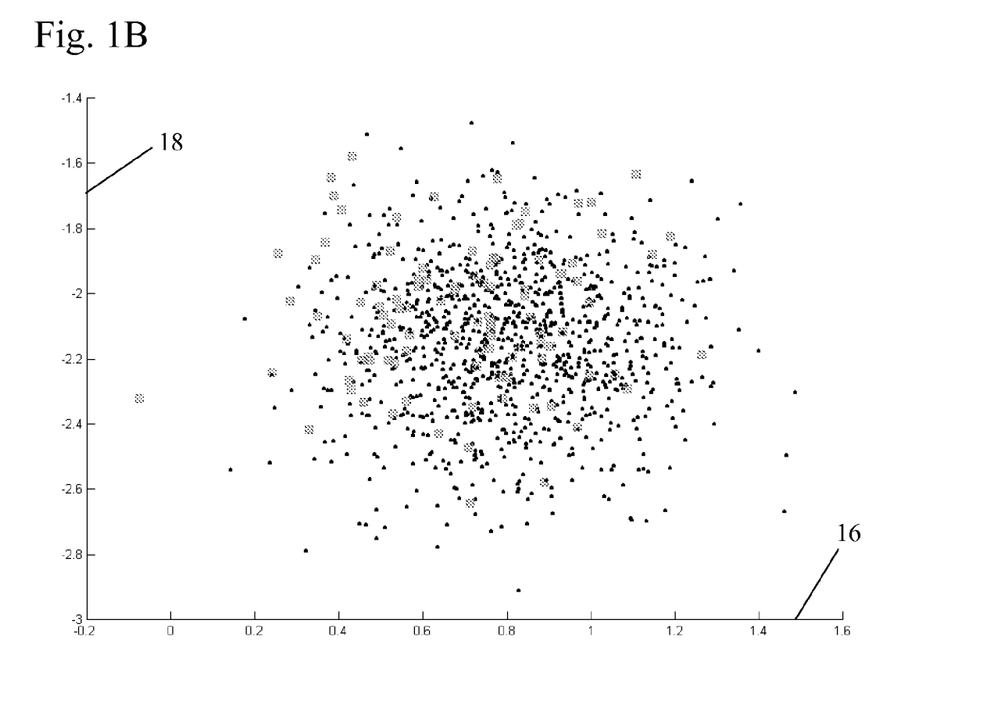
FIG. 1B shows the optimal 2D view of cluster separation of the 3D data in FIG. 1A.
Figure 1C:
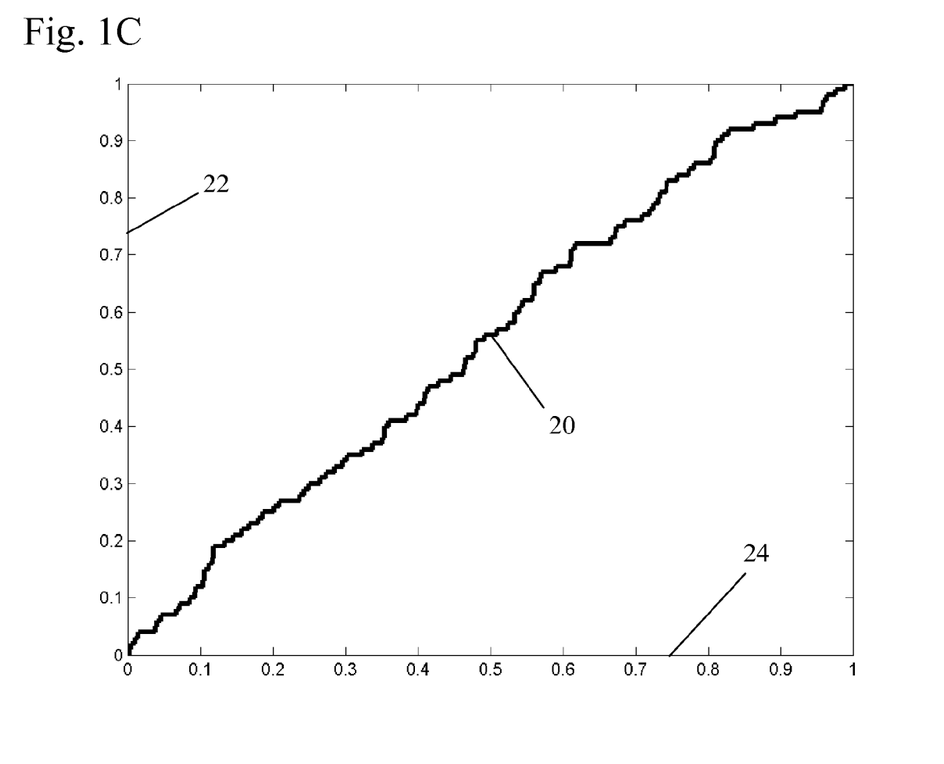
FIG. 1C shows the ROC curve calculated after projecting the 2D data in FIG. 1B onto its first principal component.

In a third step of the method, a principal component analysis (PCA) is performed to reduce the ND data to 3D. In some embodiments, the principal component analysis is performed using a processor. The 3D data is plotted and inspected for a possibility of eventual subpopulation separation or pre-clustering of subpopulation data. In order to illustrate methods of the present invention, 1100 data points were generated, each described by 25 independent variables. For 1000 of the 25D data points, shown as black dots in FIG. 1A through FIG. 3A, each variable was randomly distributed with a nominal mean of 1.0 and standard deviation of 0.2. For the remaining 100 data points, shown as grey squares in FIG. 1A through FIG. 3A, a slight systematic difference was introduced in which variables 1 through 10 were distributed about a mean of 0.94, and variables 16 through 25 were distributed about a mean of 1.06. FIG. 1A shows a 3D projection, with a first principal component axis (10), a second principal component axis (12), and a third principal component axis (14), resulting from the performance of PCA on the set of 25D randomly generated data. FIG. 1B shows the optimal 2D view, with a first axis (16) and a second axis (18), of a cluster separation of the 3D data of FIG. 1A. The numbers along the axes in FIG. 1A and FIG. 1B, as well as in FIGS. 2A, 2B, 3A, 4A, 5A, 6A, 7A, and 8A, are in arbitrary units. The 2D data of FIG. 1B may then be projected onto its first principal component to obtain the receiver-operator characteristic (ROC) curve for this complete ND-to-1D projected data. FIG. 1C shows the ROC curve (20), in a plot of the sensitivity, or true positive fraction (22), of the data projection against its specificity, or false positive fraction (24). The area under the curve (AUC) value for this data is 0.549.

In a preferred fourth step of the method, a COM transformation matrix is acquired for transforming the ND data set to a 3D data set. In some embodiments, the COM transformation matrix is acquired using a processor. The COM transformation matrix is an optimized matrix acquired by performing a center of mass (COM) separation, which is a multidimensional nonlinear unconstrained minimization on the data set with the goal of pulling apart the centers of mass of the two or more known subpopulation clusters in lower-dimensional space. The fourth step may use any search method including, but not limited to, the Nelder-Mead Simplex Optimization, the Broyden-Fletcher-Goldfarb-Shanno Method, the Trust Region Optimization, the Newton-Raphson Optimization, or a variation of the Conjugate Gradient Method. Beginning with the top 3 PCA vectors or, in other words, using that ND-to-3D transformation as the starting-point simplex for the nonlinear minimization, typically is preferred over other combinations of less energetic vectors, and should assist in avoiding local minima during the unsupervised search process. However, in some cases, especially with discretized data, as in the heart disease data set described herein, a different 3-vector simplex may yield a more desirable starting point from which to begin the separation process (e.g. the best-suited simplex for analysis of the heart data was generated from its first, second, and twelfth principal components).

In preferred embodiments of this search, the objective function to be minimized is user-defined but is generally proportional to the size of the cluster or clusters, which is often raised to a power other than 1, and inversely proportional to the separation distances of the centers of mass of the clusters. In many cases, the separation distance may be divided into the cluster size term, and the search function may be run to minimize the quotient. The numerator keeps the coordinate system from simply expanding to separate cluster centers. Alternatively, one may impose a unit-length condition on the length of the ND-to-3D transformation vectors, but in some cases, this calculation is more time-consuming than the previously-mentioned strategy. The search function is run until steady state is reached or until it is otherwise terminated by the user.

For the generated data example, the objective function which was minimized for the COM separation was:

$$F_{COM} = \frac{(d_{1,max} + d_{2,max})}{L_{COM}} \quad (1)$$

where $d_{1,max}$ is the maximum diameter of the first cluster, determined as the largest distance between any two points in the first cluster, $d_{2,max}$ is the maximum diameter of the second cluster, determined as the largest distance between any two points in the second cluster, and $L_{COM}$ is the distance between the center of mass of the first cluster and the center of mass of the second cluster.

Alternatively, the sum of the distance from the center of mass of the first cluster to the farthest outlying point of the first cluster and the distance from the center of mass of the second cluster to the farthest outlying point of the second cluster may be used as the numerator of the objective function for the COM separation, to reduce computation time.

Figure 2A:
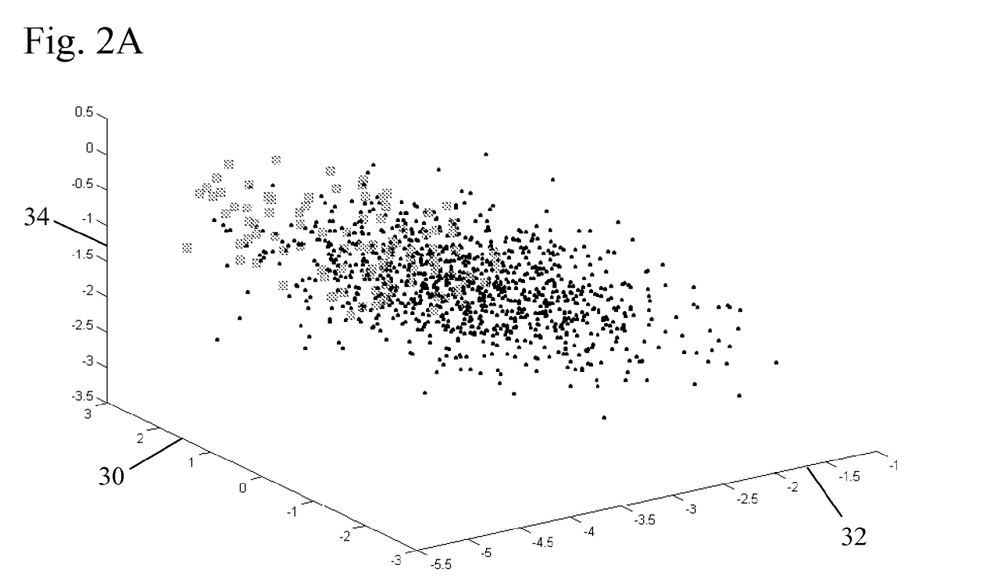
FIG. 2A shows the results of performing a centers of mass (COM) separation on the PCA-projected, 25D randomly generated data in FIG. 1A.
Figure 2B:
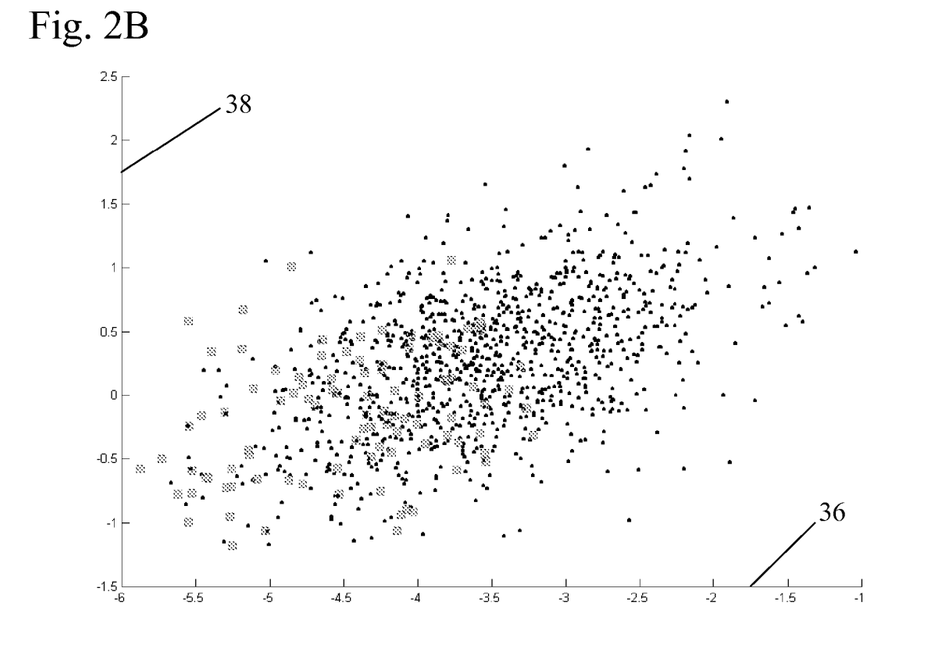
FIG. 2B shows the optimal 2D view of cluster separation of the 3D data in FIG. 2A.
Figure 2C:
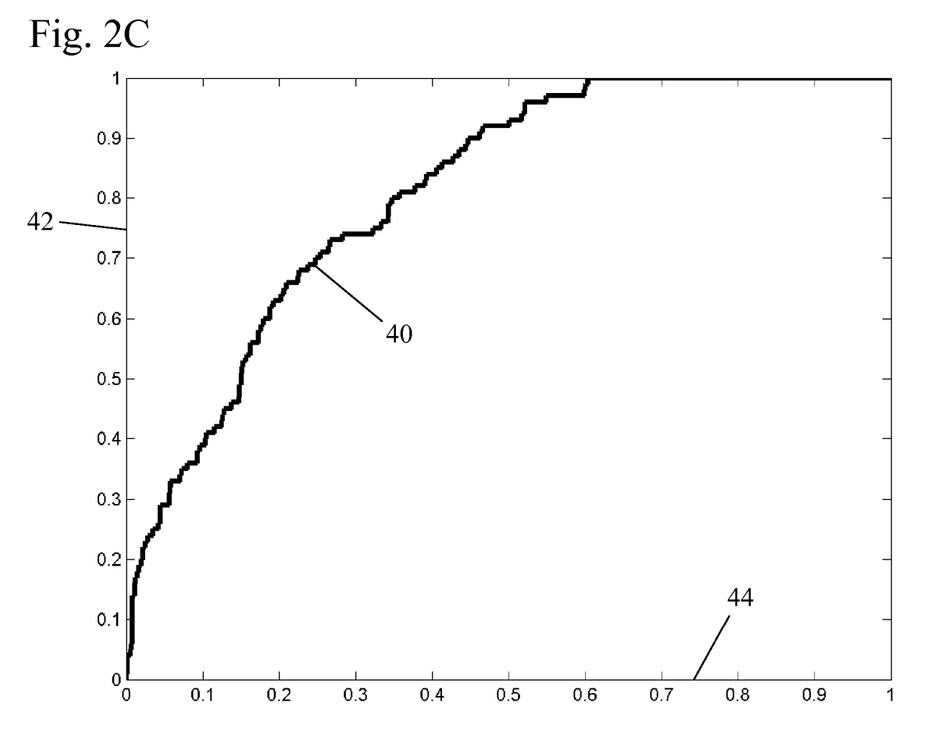
FIG. 2C shows the ROC curve calculated after projecting the 2D data in FIG. 2B onto its first principal component.

In a fifth step of the method, the data clusters are once again visualized in 3D, by applying the COM transformation matrix generated in the previous step by the first search function minimization to the data. In some embodiments, the data clusters are visualized in 3D using a processor. FIG. 2A shows the result of performing this first separation, or separation of the centers of mass (COM) on the randomly-generated data 25D data set, as visualized in 3D with new basis set first, second, and third axes (30, 32, 34, respectively). A shift between the two clusters in FIG. 2A, in comparison to the two clusters in FIG. 1A, is now observable in this coordinate system. For comparison with FIG. 1B, FIG. 2B shows the optimal 2D view, with a first axis (36) and a second axis (38), of a cluster separation of the 3D data of FIG. 2A. The 2D data of FIG. 2B may then be projected onto its first principal component to obtain the receiver-operator characteristic (ROC) curve for this data. For comparison with FIG. 1C, FIG. 2C shows the ROC curve (40), in a plot of the sensitivity, or true positive fraction (42), of the data projection against its specificity, or false positive fraction (44). The area under the curve (AUC) value for this data projection is 0.810, indicating that the application of the COM transformation matrix to the data has significantly improved the separation of the 3D data clusters.

The values of the primary component of the transformation vectors after application of the COM transformation matrix reflect the systematic differences introduced to variables 1-10 and 16-25, as described previously. That is, the first ten weighting factors of the first principal transformation vector are generally negative and the last ten are positive, as shown in Table 1. The middle five generally show less energy, as there should be no significant difference between the distributions of these variables in data points from either cluster, other than those resulting from the finite nature of the randomly-generated data sets.

In a sixth step of the method, a 3D-to-2D transformation matrix is applied to reduce the 3D data from the application of the ND-to-3D transformation matrix to 2D. In some embodiments, the 3D-to-2D transformation matrix is applied using a computer. Although PCA may be performed again to directly reduce the 3D data down to 1D, followed by an ROC separation as described below, instead a step is preferably inserted to find the best projection of the 3D data into 2D. This is because the ROC plot that results from direct 3D-to-1D PCA is, in some cases, negatively affected by just one or two

TABLE 1

Variable Weights of the First Primary Transformation Vector

| Variable Number | Weight |
|---|---|
| 1 | −0.00004 |
| 2 | −0.82514 |
| 3 | −0.42606 |
| 4 | −1.70951 |
| 5 | −1.81550 |
| 6 | −0.09908 |
| 7 | 0.20301 |
| 8 | −1.43820 |
| 9 | −0.57556 |
| 10 | −0.03762 |
| 11 | −0.07387 |
| 12 | 0.0000 |
| 13 | −0.06835 |
| 14 | −0.61493 |
| 15 | 0.70024 |
| 16 | 0.87181 |
| 17 | 0.00026 |
| 18 | 1.19522 |
| 19 | 0.89143 |
| 20 | 1.01788 |
| 21 | 1.19856 |
| 22 | 0.30629 |
| 23 | 0.23743 |
| 24 | 0.70838 |
| 25 | 0.72203 | outliers. Outliers are data points not on the main axis of the data, typically the one axis along which most of the actual separation takes place. Therefore, this sixth step is preferably an automated search for the 3D-to-2D transformation matrix that results in optimal separation of the two or more data clusters, i.e. minimizes cluster overlap as quantified by a user-defined metric. In one embodiment, the area under a ROC curve is maximized when employing variously-shaped decision boundaries (in 2D) or further projecting into 1D for the simple, scalar ROC analysis described herein. This optimized matrix then serves as the simplex in the ROC separation described below. This step may alternatively be performed manually as the user inspects the data cluster separation arising from the application of the COM transformation matrix. The user, upon visualizing the projected data in the new basis set, may rotate the plot, using appropriate available software, to find the best angle from which to view the data points and cluster separation. The user is effectively looking for an angle from which a close-to-optimal ROC plot results when that 2D image is further projected to a 1D line along its principal component axis. The result amounts to the 2D projection to the computer screen that shows the best separation of the data clusters. The user may then take that orthographic 3D-to-2D transformation matrix from the computer program and use it to project the 3D data into 2D for further analysis, or the user may choose to further refine the selection of this matrix via automated search, as described above. It should be noted that this matrix is distinct from the COM transformation matrix that has been optimized, and will itself be optimized in the next step of the method. FIGS. 1B and 2B show the resulting 2D plots after finding and applying the proper orthographic matrix for the original and post-COM transformation data, respectively.

In a seventh step of the method, starting from the result of the previous step, an iterative nonlinear minimization is performed by applying a second minimization function. In some embodiments, the iterative nonlinear minimization is performed using a processor. This step may be done regardless of whether or not the step of first finding an improved separation space has been done to overcome the shortcomings of automated 3D-to-1D PCA. In this second minimization, instead of minimizing an objective function that is inversely proportional to the separation distances of the centers of mass, the objective function in the second minimization is preferably proportional to the percentage of cluster overlap, in order to obtain an ROC curve with a maximized AUC. The substitution for the objective function is made to deal with the discrete data problem one may experience during the minimization.

The 3D-to-2D matrix found above was selected to serve as an optimized starting-point (simplex) of the 2D data projection, which is then further projected to a 1D line along its principal component axis, since an ROC may be automatically generated from 1D data very easily and unambiguously. However, since Nelder-Mead and many other types of search methods typically search for a local minimum, when discrete data are spread out in relation to the step-size of the computational search, the minimization often stabilizes on a non-ideal transformation associated with a local minimum instead of a better global minimum. To avoid this problem, the limited amount of discrete 1D data, that heretofore has been used directly, may be substituted with a large amount of data that has the same mean and standard deviation, or, in other words, a Gaussian fit to the original data. For example, in the case of the two clusters above, we have 1000 random control data points and 100 abnormal data points. Generating 10,000 similarly-distributed data points for each cluster, such that the holes in the data are filled in, is sufficient, in this case, to eliminate the non-ideal stabilization of the search function. It should be noted, however, that a Gaussian fit is the simplest approximation, which may not be the best or most appropriate one in every, or perhaps any, individual case. Each case is preferably carefully inspected to determine the most appropriate function with which to fit to the original 1D data projection, particularly if it is found that a Gaussian fit produces poor results. Then, by automatically generating an ROC curve from which to quantify the amount of cluster overlap, a minimization method (e.g. Nelder-Mead) is run again to find the ROC transformation matrix that results in the lowest amount of overlap. The ROC transformation matrix is preferably a 3D-to-2D transformation matrix, and 2D-to-1D PCA is preferably performed to facilitate the automated generation of an ROC curve, which is a straightforward process on 1D data. Using an ROC curve allows one to write a simple program to calculate the area under the curve (AUC). Thus, a clear objective function to minimize is one that is proportional to [1/(AUC)]. Also, the user is optimizing the ROC directly now, unlike with the centers of mass separation, which is what is of utmost importance in terms of improving the diagnostic power of the data analysis.

In a preferred embodiment, the COM transformation matrix is simultaneously re-optimized during the process of acquiring the ROC transformation matrix. Although the re-optimized COM transformation matrix is much more similar to the initial COM transformation matrix than the initial COM transformation matrix is to the PCA matrix, re-optimization of the COM transformation matrix during acquisition of the ROC transformation matrix improves the overall cluster separation of the data and the resulting AUC value.

For the generated data example, the objective function which was minimized for the ROC separation was:

$$F_{ROC} = \frac{1}{AUC} \tag{2}$$

where AUC is the area under the curve for the receiver-operator characteristic curve.

Figure 3A:
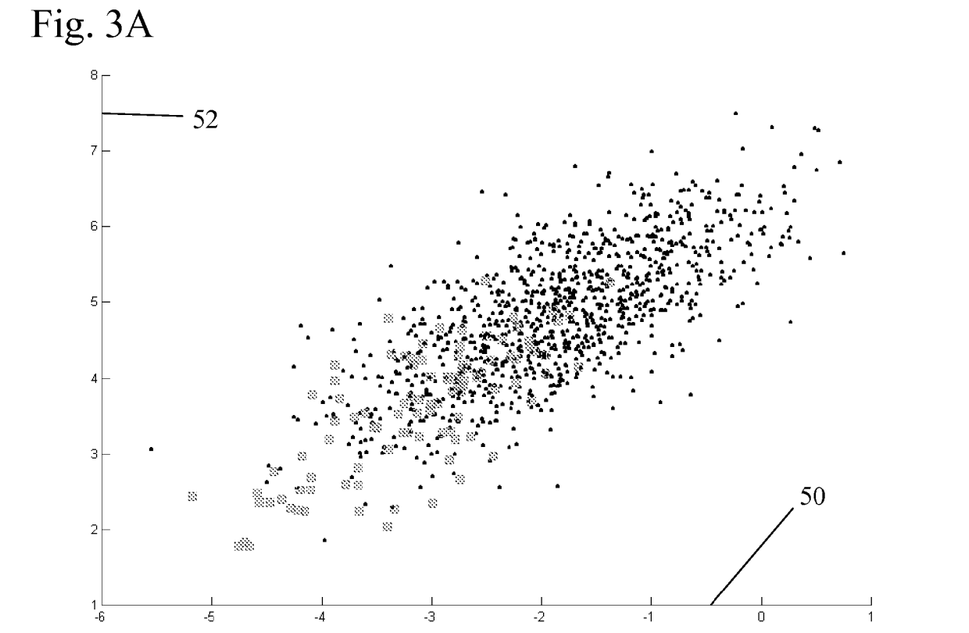
FIG. 3A shows the results of performing a COM separation followed by a percent overlap separation on the PCA-projected, 25D randomly generated data in FIG. 1A.
Figure 3B:
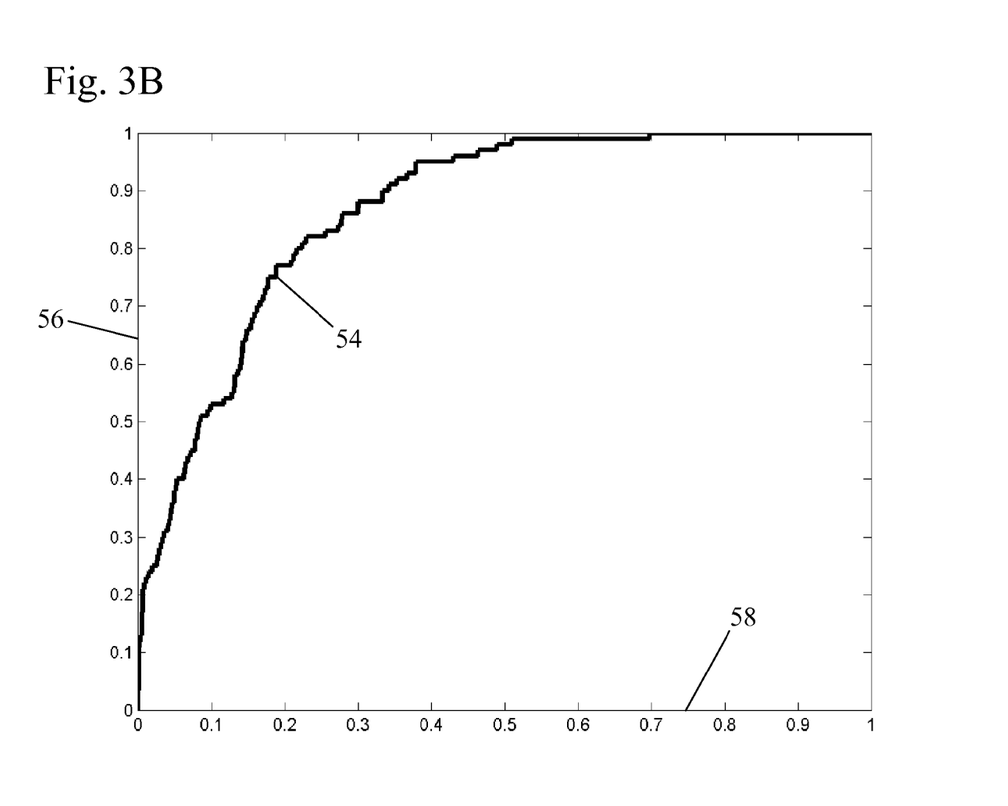
FIG. 3B shows the ROC curve calculated after projecting the 2D data in FIG. 3A onto its first principal component.

For comparison with FIG. 1B and FIG. 2B, FIG. 3A shows the 2D result with a first axis (50) and a second axis (52) after performing PCA followed by a center of mass separation (COM transformation matrix acquisition) and then a percent overlap, or ROC, separation (ROC transformation matrix acquisition) on the randomly generated data. For comparison with FIG. 1C and FIG. 2C, FIG. 3B shows the ROC curve (54), in a plot of the sensitivity, or true positive fraction (56), of the data projection against its specificity, or false positive fraction (58). FIGS. 1C, 2C, and 3B show the resultant ROC curves when observing the separation status using PCA alone prior to acquiring the COM transformation matrix, after application of the COM transformation matrix, and after application of the ROC transformation matrix (and re-optimized COM matrix), respectively. A significant increase in the value of AUC, from an almost smallest possible value of 0.549 in FIG. 1C, with the minimum for any assay being 0.50, to the clinically-useful value of 0.810 in FIG. 2C after application of the COM transformation matrix, and ultimately to the further-improved value of 0.867 in FIG. 3A after application of the ROC transformation matrix (and re-optimized COM matrix), is obtained. Furthermore, an additional 100 25D "abnormal" data points were generated and projected into the vector spaces shown in FIGS. 2A and 3A. No significant differences were observed between the distribution of these newly-generated data and the distribution of the original 100 abnormal data points that made up one of the data clusters used to optimize the corresponding transformation matrices. This process was repeated several times with the same result, indicating that "over-fitting" of the data was not an issue for this example (1000+100 data points and 25 variables per data point).

The cluster separation methods described herein were applied to a variety of public domain data, all of which are publicly available online from the Machine Learning Repository of the University of California Irvine at http://archive.ics.uci.edu/ml/. The selected data set have also been recently analyzed using a number of cluster analysis techniques, the results of which were published by Tax et al. ("Outlier Detection Using Ball Descriptions with Adjustable Metric", SSPR&SPR, 2006, pp. 587-595), which is hereby incorporated by reference herein. These techniques included standard approaches (i.e. simple Gaussian distributions, the Minimum Covariance Determinant algorithm, the Parzen density estimator, the k-centroid method, and the support vector data description) as well as variations on three new formulations of the so-called $f_p$-distance parameterization.

SPECT Heart Data Set

Figure 4A:
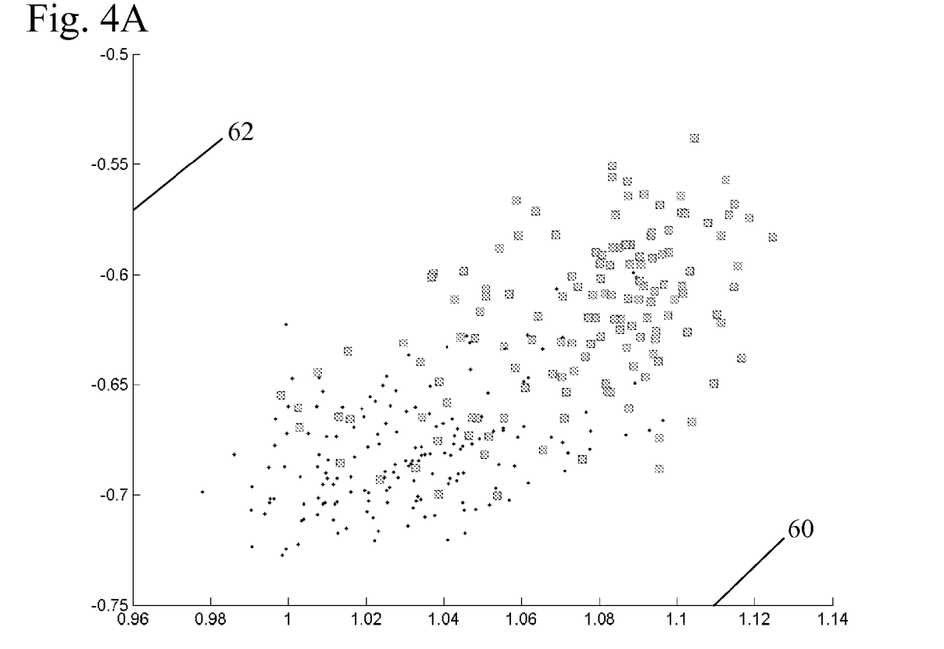
FIG. 4A shows the results of performing PCA followed by a COM separation followed by a percent overlap separation on public domain, 13D heart disease data.
Figure 4B:
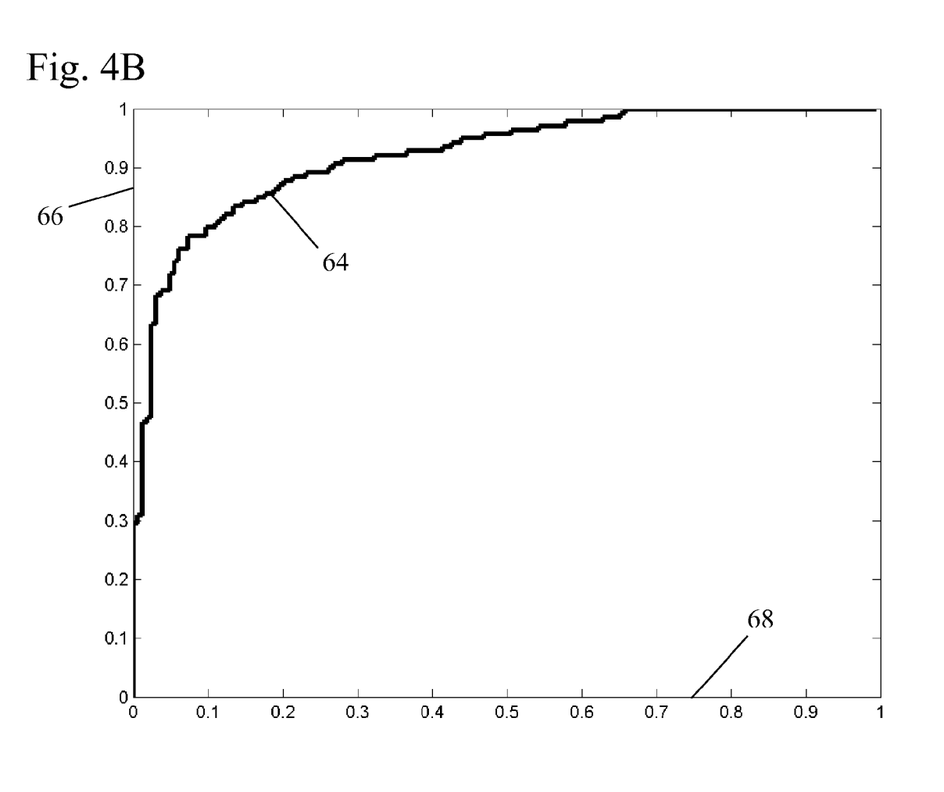
FIG. 4B shows the ROC curve calculated after projecting the 2D data in FIG. 4A onto its first principal component.

Methods of the present invention were applied to the Single Proton Emission Computed Tomography (SPECT) Heart Data Set, which is available online at http://archive.ics.uci.edu/ml/machine-learning-databases/heart-disease/processed.cleveland.data and is hereby incorporated herein by reference. The data set includes 164 data points from healthy patients and 139 from diseased (narrowed vessel) patients. Each data point includes 13 variables. These variables are: age, sex, chest pain type, resting blood pressure, serum cholesterol, fasting blood sugar, resting electrocardiograph results, maximum heart rate, presence or absence of exercise induced angina, ST depression induced by exercise relative to rest, the slope of the peak exercise ST segment, number of major vessels (0-3) colored by fluoroscopy, and thallium 201 uptake. FIGS. 4A and 4B show the result of applying methods of the present invention to optimize separation of heart disease data clusters. In FIG. 4A, each data point represents the optimized weighting of 13 variables. The objective function which was minimized for the COM separation of the heart data was:

$$F_{COM} = \frac{(d_{1,max} + d_{2,max})^{3/2}}{L_{COM}} \quad (3)$$

where $d_{1,max}$ is the maximum diameter of the first cluster, determined as the largest distance between any two points in the first cluster, $d_{2,max}$ is the maximum diameter of the second cluster, determined as the largest distance between any two points in the second cluster, and $L_{COM}$ is the distance between the center of mass of the first cluster and the center of mass of the second cluster.

The healthy (absence of heart disease) data cluster is shown as black points, and the diseased data cluster as grey squares in a 2D plot with a first axis (60) and a second axis (62) after application of the ROC transformation matrix and the re-optimized COM matrix. FIG. 4B shows the ROC curve (64), in a plot of the sensitivity, or true positive fraction (66), of the data projection against its specificity, or false positive fraction (68). Equation 2 was used as the objective function for minimization for the ROC separation. The resultant AUC value after implementing all separation methods to separate the healthy and diseased patient clusters is approximately 0.921. This value is not affected by considering one the target class and the other the outlier, or vice versa, as it is with some of the methods presented in Tax et al. In comparison to the 11 methods used by Tax et al. to identify diseased patient data points as outliers of the healthy patient cluster, the highest AUC value they report is 0.839, with a reported mean AUC value of 0.732 and a standard deviation of 0.152. In comparison to the 12 methods used by Tax et al. to identify healthy patient data points as outliers of the diseased patient cluster, the highest AUC value Tax et al. report is 0.789, with a reported mean AUC value of 0.696 and a standard deviation of 0.053.

University of Wisconsin Diagnostic Breast Cancer Data Set

Figure 5A:
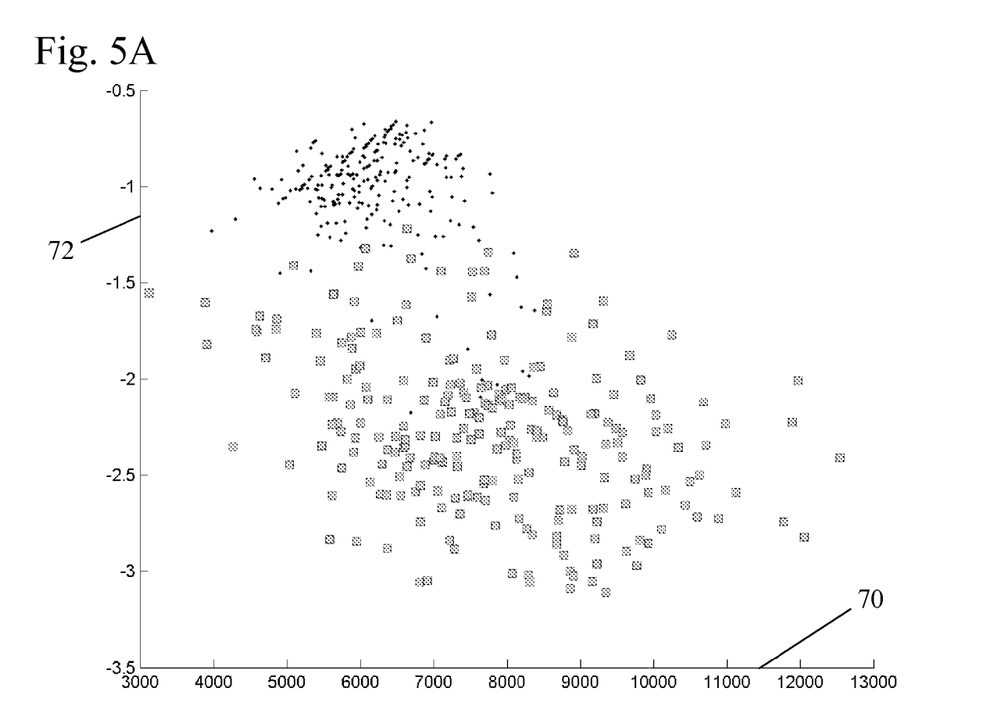
FIG. 5A shows the results of performing PCA followed by a COM separation followed by a percent overlap separation on public domain, 9D breast cancer data.
Figure 5B:
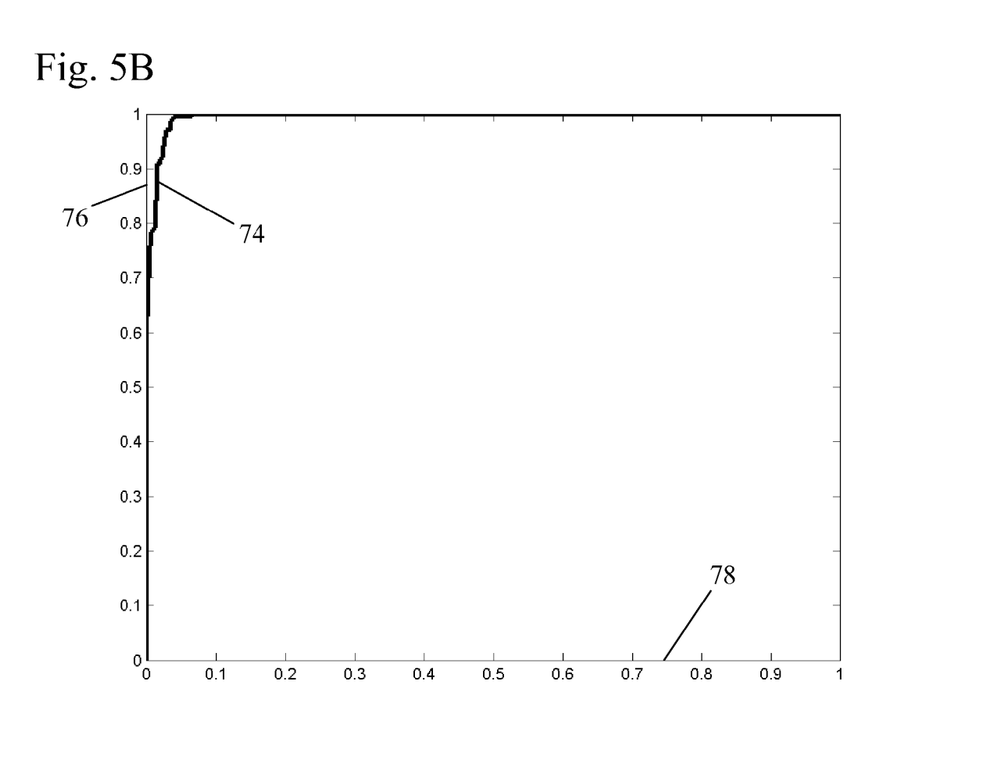
FIG. 5B shows the ROC curve calculated after projecting the 2D data in FIG. 5A onto its first principal component.

Methods of the present invention were applied to the University of Wisconsin Diagnostic Breast Cancer Data Set, which is available online at http://archive.ics.uci.edu/ml/machine-learning-databases/breast-cancer-wisconsin/breast-cancer-wisconsin.data and is hereby incorporated herein by reference. The data set includes 458 data points from benign tumor patients and 241 data points from malignant patients, each data point having been computed from a digitized image of a fine needle aspirate (FNA) of a breast mass. Each data point includes 9 variables. These variables are: clump thickness, uniformity of cell size, uniformity of cell shape, marginal adhesion, single epithelial cell size, bare nuclei, bland chromatin, normal nucleoli, and mitoses; all of which were reported as discrete values between 1 and 10. FIGS. 5A and 5B show the result of applying methods of the present invention to optimize separation of breast cancer data clusters. In FIG. 5A, each data point represents the optimized weighting of 9 variables. Equation 1 was used as the objective function for minimization for the COM separation of the breast cancer data. The benign data cluster is shown as black points, and the malignant data cluster as grey squares in a 2D plot with a first axis (70) and a second axis (72) after application of the ROC transformation matrix and the re-optimized COM matrix.

FIG. 5B shows the ROC curve (74), in a plot of the sensitivity, or true positive fraction (76), of the data projection against its specificity, or false positive fraction (78). Equation 2 was used as the objective function for minimization for the ROC separation. The resultant AUC value after implementing all separation methods to separate the benign and malignant tumor clusters is approximately 0.995. In comparison to the 12 methods used by Tax et al. to identify diseased patient data points as outliers of the healthy patient cluster, the highest AUC value Tax et al. report is 0.977, with a reported mean AUC value of 0.863 and a standard deviation of 0.121. In comparison to the 10 methods used by Tax et al. to identify healthy patient data points as outliers of the diseased patient cluster, the highest AUC value Tax et al. report is 0.993, with a reported mean AUC value of 0.985 and a standard deviation of 0.006.

E. coli Data Set

Figure 6A:
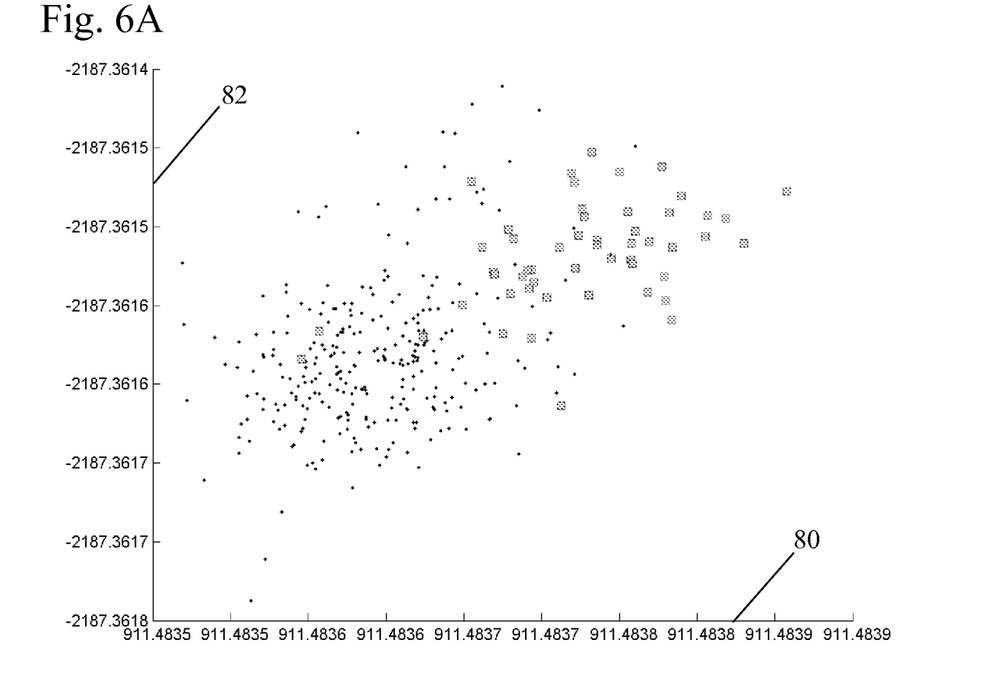
FIG. 6A shows the results of performing PCA followed by a COM separation followed by a percent overlap separation on public domain, 7D *E. coli* genetic data.
Figure 6B:
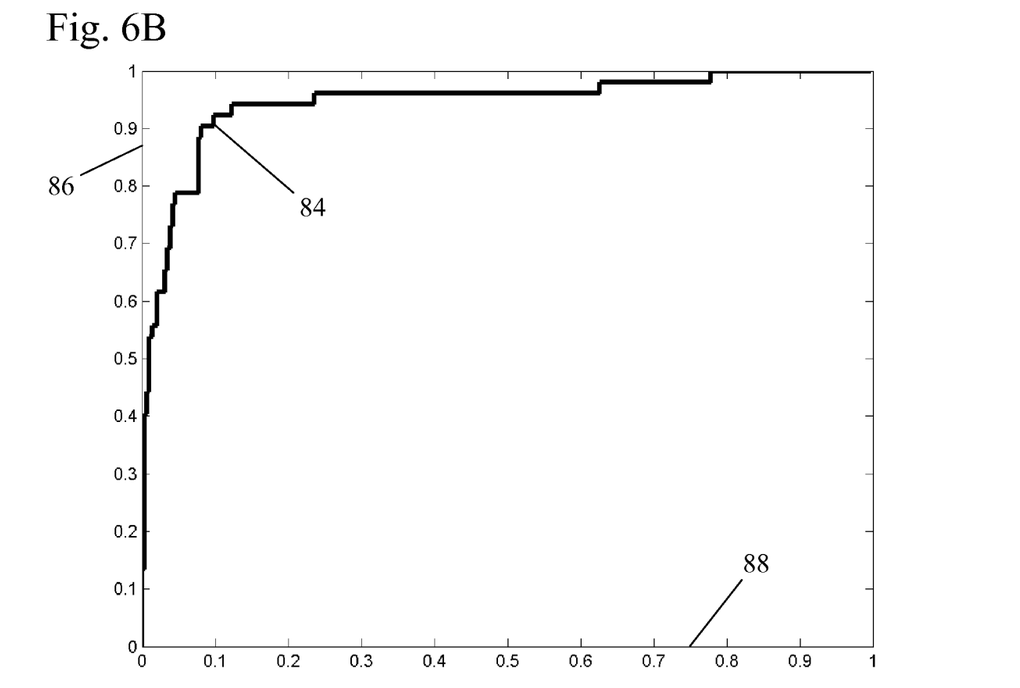
FIG. 6B shows the ROC curve calculated after projecting the 2D data in FIG. 6A onto its first principal component.

Methods of the present invention were applied to the *Escherichia coli* Data Set, which is available online at http://archivelcs.uci.edu/ml/machine-learning-databases/ecoli/ecoli.data and is hereby incorporated herein by reference. The data set includes 284 data points from non-periplasm proteins and 52 from those that localize in the periplasm. Each data point represents the optimized weighting of 7 variables. These variables are: McGeoch's method for signal sequence recognition, von Heijne's method for signal sequence recognition, von Heijne's Signal Peptidase II consensus sequence score (binary attribute), presence of charge on N-terminus of predicted lipoproteins (binary attribute), score of discriminant analysis of the amino acid content of outer membrane and periplasmic proteins, score of the ALOM membrane spanning region prediction program, and score of ALOM program after excluding putative cleavable signal regions from the sequence. FIGS. 6A and 6B show the result of applying the methods described above to optimize separation of E. coli protein localization data clusters. In FIG. 6A, the non-periplasm located proteins (i.e. those located in the cytoplasm, inner membrane, or outer membrane) data cluster is shown as black points, and the periplasm protein cluster as grey squares in a 2D plot with a first axis (80) and a second axis (82) after application of the ROC transformation matrix and the re-optimized COM matrix.

The objective function which was minimized for the COM separation of the E. coli data was:

$$F_{COM} = \frac{(d_{1,max} + 4 \cdot d_{2,max})^{5/4}}{L_{COM}} \quad (4)$$

where $d_{1,max}$ is the maximum diameter of the first cluster, which are non-periplasm proteins, determined as the largest distance between any two points in the first cluster, $d_{2,max}$ is the maximum diameter of the second cluster, which includes proteins located in the periplasm, determined as the largest distance between any two points in the second cluster, and $L_{COM}$ is the distance between the center of mass of the first cluster and the center of mass of the second cluster.

In this case the second cluster diameter was multiplied by a factor of four to account for several outliers in the second cluster of data.

FIG. 6B shows the ROC curve (84), in a plot of the sensitivity, or true positive fraction (86), of the data projection against its specificity, or false positive fraction (88). Equation 2 was used as the objective function for minimization for the ROC separation. The resultant AUC value after implementing all separation methods to separate the periplasmic and non-periplasmic protein clusters is approximately 0.945 when using the 1D data projection to generate the ROC of interest, but increases slightly further to approximately 0.947 when using a nonlinear, in this case circular, decision boundary on the data projected into 2D. In comparison, to the 11 methods used by Tax et al. to identify diseased patient data points as outliers of the healthy patient cluster, the highest AUC value Tax et al. report is 0.953, with a reported mean AUC value of 0.863 and a standard deviation of 0.122). Only one of the 11 cluster identification methods utilized by Tax et al. produced a value higher than the 0.947 achieved by the present invention. This method was a variation of their newly-described approach termed the "weighted feature $l_p$-ball" formulation.

The improvement in the area under the ROC curve value over traditional and current state-of-the art cluster analysis methods, in almost all cases discussed above (55 out of 56), shows the superiority of the multivariate cluster separation methods of the present invention, particularly in their application to the field of medical diagnostics.

New Health Sciences, Inc. (NHSi; Bethesda, Md.) Sleep Apnea Data Set

Figure 7A:
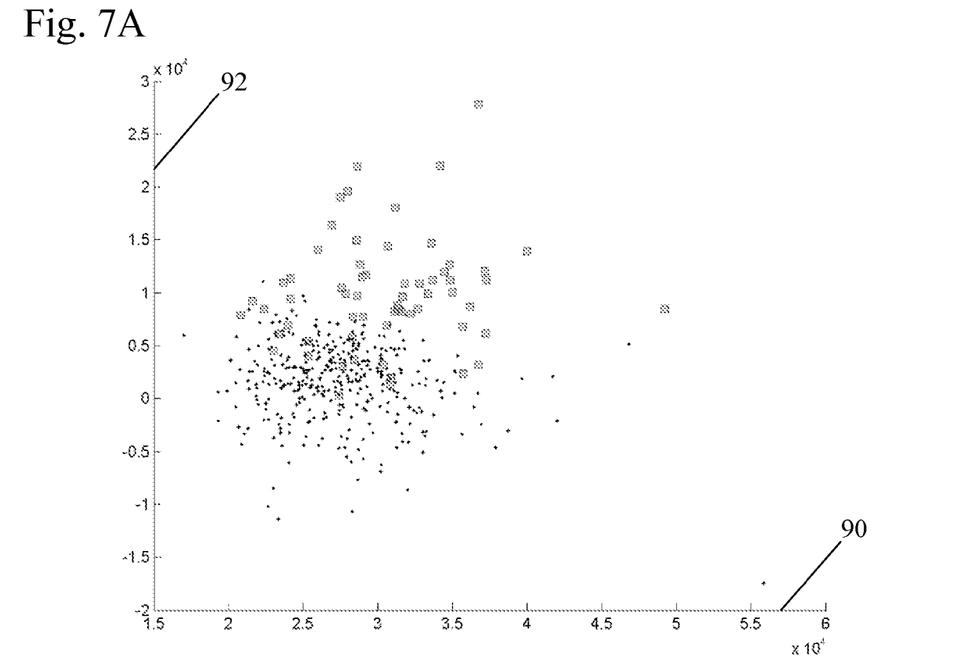
FIG. 7A shows the results of performing PCA alone on 57D sleep apnea data.
Figure 7B:
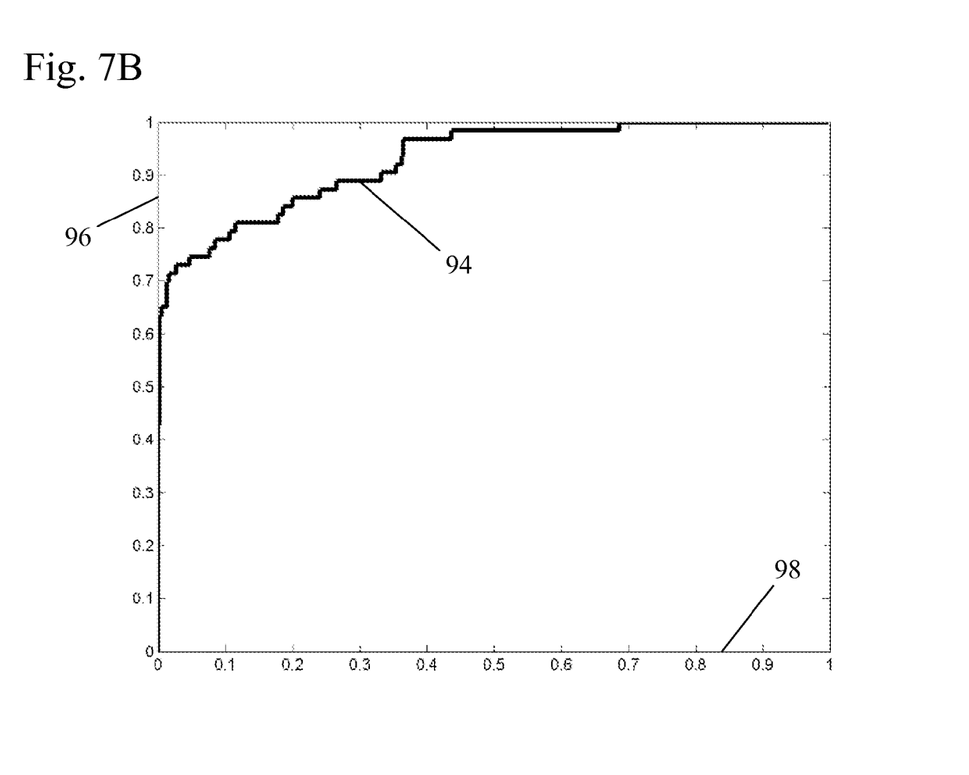
FIG. 7B shows the ROC curve calculated after projecting the 2D data in FIG. 7A onto its first principal component.
Figure 8A:
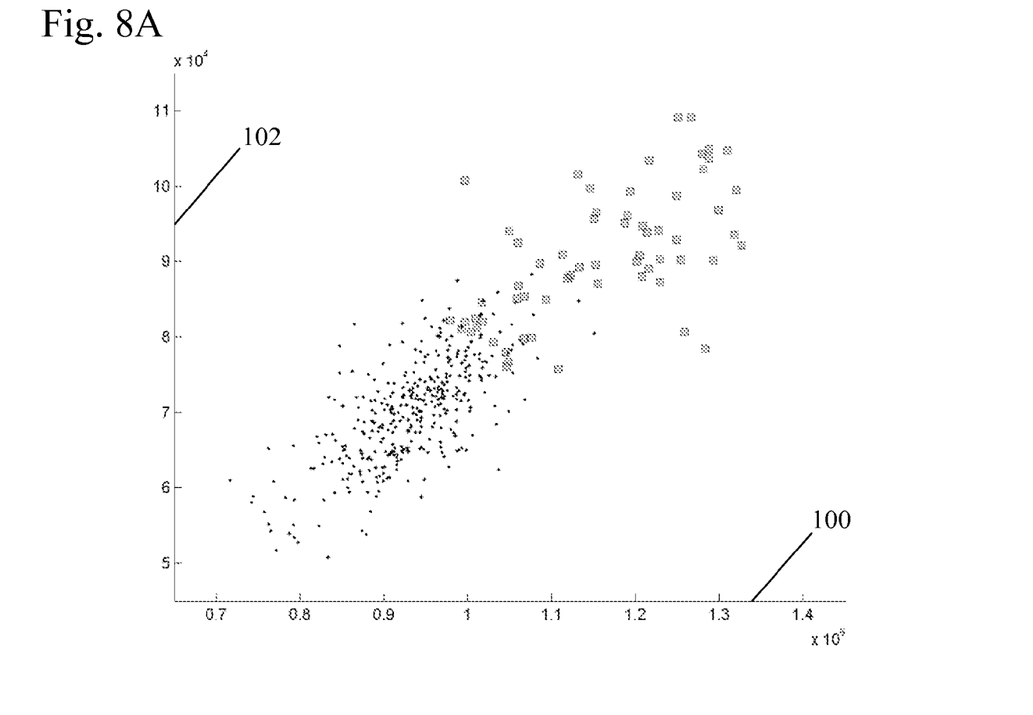
FIG. 8A shows the results of performing PCA followed by a COM separation followed by a percent overlap separation on 57D sleep apnea data.
Figure 8B:
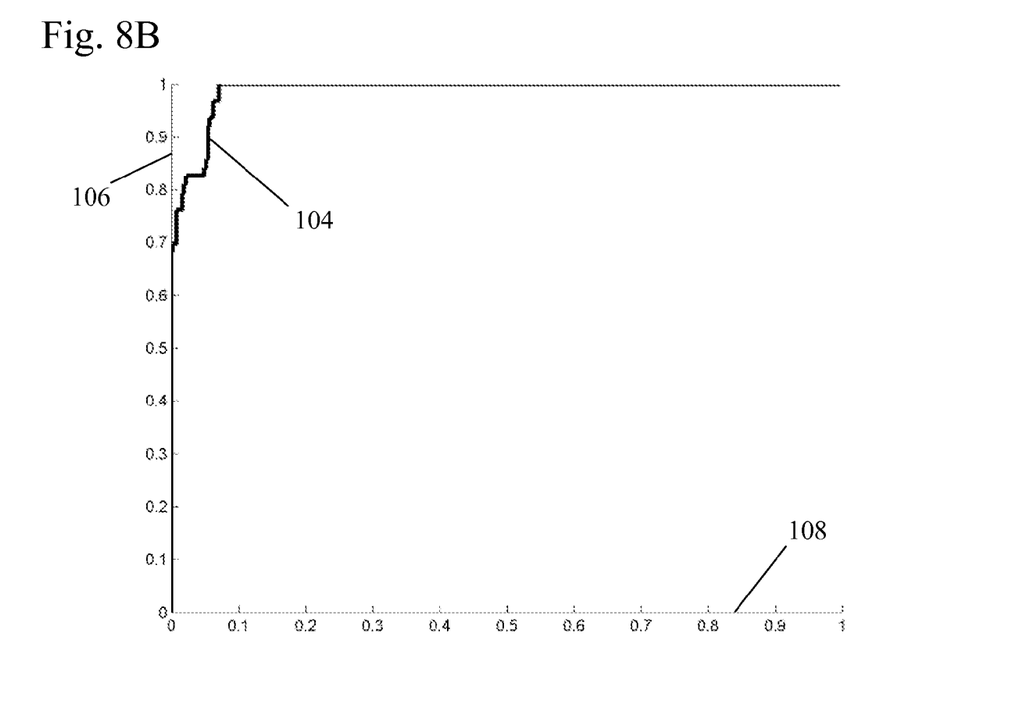
FIG. 8B shows the ROC curve calculated after projecting the 2D data in FIG. 8A onto its first principal component.

Methods of the present invention were applied to a NHSi sleep apnea data set. The data set includes 364 data points from asymptomatic subjects and 64 data points from patients suffering from sleep apnea (diagnosed by polysomnogram), each data point having been computed from a set of Transcranial Doppler waveforms measured for each of 19 blood vessels in the brain. Each data point includes 57 variables (3 parameters measured for each blood vessel). These parameters are mean flow velocity, systolic acceleration, and pulsatility index. FIGS. 7A and 7B show the result of applying only standard PCA and automated 3D-to-2D ROC transformation matrix acquisition to the 57D data. In FIG. 7A, the asymptomatic subject data cluster is shown as black points, and the sleep apnea patient data cluster as grey squares in a 2D plot with a first axis (90) and a second axis (92) after the application of standard PDA. FIGS. 8A and 8B show the result of applying methods of the present invention to optimize separation of the projected data clusters. In FIG. 8A, each data point represents the optimized weighting of 57 variables. Equation 1 was used as the objective function for minimization for the COM separation of the data. The asymptomatic subject data cluster is shown as black points, and the sleep apnea patient data cluster as grey squares in a 2D plot with a first axis (100) and a second axis (102) after application of the ROC transformation matrix and the re-optimized COM matrix.

FIG. 7B shows the ROC curve (94), in a plot of the sensitivity, or true positive fraction (96), of the data projection against its specificity, or false positive fraction (98), prior to running any separation algorithms. FIG. 8B shows the ROC curve (104), in a plot of the sensitivity (106) of the data projection against its specificity (108), after application of the ROC transformation matrix (and re-optimized COM matrix). Equation 2 was used as the objective function for minimization for the ROC separation. The resultant AUC value after implementing all separation methods to separate the asymptomatic and sleep apnea positive clusters is approximately 0.988, which is much improved in comparison to the AUC value of 0.928 that results from employing PCA data visualization alone.

Methods of the present invention may use a cluster size term (numerator) raised to the power equal to unity in the objective function for the COM separation. Preferably, the power to which the cluster size term is raised is determined by inspecting the original pre-algorithm cluster separation, i.e. the one achieved by PCA alone, and the results of the Nelder-Mead or other search method optimization, which is typically run iteratively 10 to 40 times to achieve steady-state. Improved results may be achieved by optimizing the power term for the objective function for the COM separation.

The results of these methods may be ultimately embodied in a single transformation matrix that allows one to visualize the original N-dimensional data in 1, 2, 3, or even 4 dimensions, depending on the sophistication of the user and his or her specific needs, such that the differences between the clusters of data are maximally exhibited. By determining this optimal transformation matrix, or set of optimal transformation matrices, on a set of known, or training, data, future test data may be assigned to a particular cluster with an established level of confidence. Furthermore, a particular transformation matrix, or set of transformation matrices, that categorizes data acquired via a novel medical assay may be continually updated, as additional data from patients that have been independently diagnosed by other, more commonly-accepted techniques are added to the database over time.

Preferably, at least one data manipulation of a method of the present invention is performed by a processor. In some embodiments, multiple data manipulations are performed by a processor. In some embodiments, all of the data manipulations are performed by a processor. In some embodiments, the microprocessor is a computer.

All of the references cited in this application are hereby incorporated by reference herein.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of separating in lower dimensional space a data set comprising a plurality of multivariate data points, wherein each data point has been classified in one of a plurality of data clusters comprising at least a first data cluster and a second data cluster, the method comprising the steps of:
   a) a computer acquiring an ND-to-3D transformation matrix for transforming the plurality of multivariate data points to a plurality of three-dimensional data points; and
   b) the computer performing a receiver-operator characteristic curve (ROC) separation to acquire an ROC transformation matrix for transforming the plurality of three-dimensional data points to a plurality of data points in a dimension lower than 3D.

2. The method of claim 1, wherein step a) further comprises the sub-step of performing a principal component analysis (PCA) on the data set.

3. The method of claim 1, wherein step a) further comprises the sub-step of performing a center of mass (COM) separation of the clusters to acquire a COM transformation matrix, wherein the COM transformation matrix is the ND-to-3D transformation matrix.

4. The method of claim 3 further comprising the step of using the COM transformation matrix and the ROC transformation matrix to assign an unknown multivariate data point to one of the at least two clusters with a calculated level of confidence.

5. The method of claim 3, wherein the sub-step of performing a center of mass (COM) separation of the clusters comprises minimizing a function $F_{COM}$, wherein:

$$F_{COM} = \frac{(C_1 \cdot d_{1,max} + C_2 \cdot d_{2,max})^m}{L_{COM}};$$

wherein
$d_{1,max}$ is a maximum diameter of the first cluster, determined as a largest distance between a first data point and a second data point of the first cluster;
$d_{2,max}$ is a maximum diameter of the second cluster, determined as a largest distance between a first data point and a second data point of the second cluster;
$L_{COM}$ is a distance between a center of mass of the first cluster and a center of mass of the second cluster; and
m, $C_1$, and $C_2$ are non-negative real numbers.

6. The method of claim 5, wherein minimizing the function $F_{COM}$ comprises using a technique selected from the group consisting of a Nelder-Mead Simplex Optimization, a Broyden-Fletcher-Goldfarb-Shanno Method, a Trust Region Optimization, a Newton-Raphson Optimization, and a variation of a Conjugate Gradient Method.

7. The method of claim 5, wherein m is selected by inspection of results of the PCA and a comparison of results of the COM separation when m=1, and results of the COM separation as m is varied higher or lower.

8. The method of claim 1, wherein step b) further comprises the sub-step of performing a supplemental center of mass (COM) separation while performing the ROC separation to acquire a modified COM transformation matrix.

9. The method of claim 1 further comprising the step of inspecting the plurality of three-dimensional data points to determine a 3D-to-2D transformation matrix prior to step b).

10. The method of claim 9, wherein the step of inspecting the plurality of three-dimensional data points comprises performing an automated search for the 3D-to-2D transformation matrix, wherein the 3D-to-2D transformation matrix is an optimized matrix.

11. The method of claim 9, wherein the step of inspecting the plurality of three-dimensional data points comprises manually inspecting the three-dimensional data points visually and manually acquiring the 3D-to-2D transformation matrix, wherein the 3D-to-2D transformation matrix meets a predetermined separation requirement.

12. The method of claim 1, wherein step b) further comprises the sub-step of minimizing a function $F_{ROC}$, wherein:

$$F_{ROC} = \frac{1}{AUC};$$

wherein
AUC is an area under a receiver-operator characteristic curve of the data set.

13. The method of claim 1 further comprising the step of acquiring the data set.

14. The method of claim 1 further comprising the step of classifying the data points into the at least two clusters.

15. The method of claim 1 further comprising the step of filling in missing data in the data set.

16. The method of claim 15, wherein the step of filling in missing data in the data set comprises using a mean value or a median value.

17. The method of claim 1 further comprising the step of obtaining a receiver-operator characteristic curve.

18. A method of separating in lower dimensional space a data set comprising a plurality of multivariate data points, wherein each data point has been classified in one of a plurality of data clusters comprising at least a first data cluster and a second data cluster, the method comprising the steps of:
   a) a processor acquiring an ND-to-3D transformation matrix for transforming the plurality of multivariate data points to a plurality of three-dimensional data points; and
   b) the processor performing a receiver-operator characteristic curve (ROC) separation to acquire an ROC transformation matrix for transforming the plurality of three-dimensional data points to a plurality of data points in a dimension lower than 3D.

* * * * *